United States Patent
Nicq et al.

(10) Patent No.: US 10,852,215 B2
(45) Date of Patent: Dec. 1, 2020

(54) METHOD AND DEVICE FOR MONITORING AN AIRCRAFT ENGINE VANE WHEEL VIA BALANCE POSITION MEASUREMENT

(71) Applicant: Safran Aircraft Engines, Paris (FR)

(72) Inventors: Geoffroy Nicq, Thomery (FR); Valerio Gerez, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 466 days.

(21) Appl. No.: 15/520,612

(22) PCT Filed: Oct. 15, 2015

(86) PCT No.: PCT/FR2015/052774
§ 371 (c)(1),
(2) Date: Apr. 20, 2017

(87) PCT Pub. No.: WO2016/062946
PCT Pub. Date: Apr. 28, 2016

(65) Prior Publication Data
US 2017/0315021 A1 Nov. 2, 2017

(30) Foreign Application Priority Data
Oct. 22, 2014 (FR) .................... 14 60167

(51) Int. Cl.
*G01M 15/14* (2006.01)
*G01H 1/00* (2006.01)
(Continued)

(52) U.S. Cl.
CPC ............ *G01M 15/14* (2013.01); *G01H 1/006* (2013.01); *G01H 3/00* (2013.01); *G01H 3/08* (2013.01);
(Continued)

(58) Field of Classification Search
CPC . G01H 3/00; G01H 1/006; G01H 3/08; G05B 23/0235; G05B 2219/45071; G01M 15/14
See application file for complete search history.

(56) References Cited

U.S. PATENT DOCUMENTS

| 2012/0148400 A1 | 6/2012 | Gerez |
| 2013/0115050 A1* | 5/2013 | Twerdochlib .......... F01D 21/14 415/118 |

(Continued)

FOREIGN PATENT DOCUMENTS

| EP | 2 781 897 A2 | 9/2014 |
| GB | 2485891 A | 5/2012 |

OTHER PUBLICATIONS

Search Report issued in French Patent Application No. FR1460167 dated Jun. 12, 2015.

(Continued)

*Primary Examiner* — Yoshihisa Ishizuka
(74) *Attorney, Agent, or Firm* — Pearne & Gordon LLP

(57) ABSTRACT

A method for monitoring an aircraft engine vane wheel (22), which includes: acquiring at least one time signal relative to moments when the vane wheel blades (23) pass in front of a sensor (21); determining a common flight phase of the aircraft; for each flight in a series of flights of the aircraft, correlating at least part of each time signal with a predetermined flight phase; and for each blade (23), each flight, and each predetermined flight phase, measuring the mean position (24C), the so-called "balance position", of the top of the blade. The invention also relates to a device for implementing such a method. One advantage of the invention is providing a diagnosis of the blades using a small number of sensors and low computing power.

20 Claims, 5 Drawing Sheets

(51) Int. Cl.
*G01H 3/00* (2006.01)
*G05B 23/02* (2006.01)
*G01H 3/08* (2006.01)

(52) U.S. Cl.
CPC ............ *G05B 23/0235* (2013.01); *G05B 2219/45071* (2013.01)

(56) References Cited

U.S. PATENT DOCUMENTS

| 2013/0197747 A1* | 8/2013 | Tourin | F01D 21/003 |
| | | | 701/34.4 |
| 2013/0211768 A1 | 8/2013 | Gerez | |
| 2015/0177101 A1 | 6/2015 | Gerez | |
| 2016/0054233 A1 | 2/2016 | Bense | |
| 2016/0238486 A1 | 8/2016 | Bense | |

OTHER PUBLICATIONS

International Search Report issued in Application No. PCT/FR2015/052774 dated Jan. 26, 2016.
Written Opinion issued in Application No. PCT/FR2015/052774 dated Jan. 26, 2016.

* cited by examiner

METHOD AND DEVICE FOR MONITORING AN AIRCRAFT ENGINE VANE WHEEL VIA BALANCE POSITION MEASUREMENT

FIELD OF THE INVENTION

The present invention relates to the field of monitoring of an aircraft engine vane wheel. Such monitoring is carried out for example to detect damage to a wheel blade.

STATE OF THE RELATED ART

An aircraft engine includes a plurality of vane wheels. A vane wheel can be degraded, for example following an impact of an object against a wheel blade, or following a change in the aerodynamic conditions to which the vane wheel is subject.

Various methods for detecting aircraft engine vane wheel damage are known in the prior art. These methods involve detecting passage times of the blades, also known as vanes. The term "tip timing" is generally used to describe such an operation. On the basis of these passage times, a vibration signal is reconstructed for each blade. The analysis of the vibration frequency makes it possible to detect damage to a blade. The implementation of these methods requires the use of a large number of sensors, in order to obtain sufficient sampling of the blade movement.

One aim of the present invention is that of providing a method and a device for monitoring an aircraft engine vane wheel, suitable for rapidly detecting damage to a blade using a reduced number of sensors.

DESCRIPTION OF THE INVENTION

This aim is achieved with a method for monitoring an aircraft engine vane wheel, which includes:
- acquiring at least one time signal, each time signal relating to moments when the vane wheel blades pass in front of a sensor; and
- determining a common flight phase of the aircraft;

characterised in that it includes the following steps:
- for each flight in a series of flights of the aircraft, correlating at least part of each time signal with a predetermined flight phase of a set of predetermined flight phases including at least one predetermined flight phase; and
- for each blade, each flight of said series of aircraft flights, and for each predetermined flight phase, measuring a first position of interest equal to the mean position, the so-called "balance position", of the top of the blade.

Some preferred but non-limiting aspects of this method are as follows:
- it includes measuring a first position of interest for each blade, for each flight, and for at least two predetermined flight phases;
- it includes computing, for each blade, and for each predetermined flight phase, a second position of interest equal to the mean value or median value of balance positions each associated with one of a plurality of aircraft flights;
- it includes comparing between a reference position and a position of interest, in order to detect the onset of damage on the blade;
- it includes tracking the positions of interest during flights, in order to detect a progressive shift in these positions of interest;
- the balance position of a blade is measured using a single sensor, configured to detect the passage of the top of a vane wheel blade at a predetermined point;
- it includes testing for an anomaly in an acquisition chain of the at least one time signal, said testing involving a measurement of the deviation between the extrema of a set of balance positions associated with the same blade and the same predetermined flight phase, the balance positions of said set each corresponding to one of a plurality of aircraft flights;
- it includes a prior step for determining, by expert assessment of the set of predetermined flight phases, a predetermined flight phase corresponding, in terms of each blade, to a static pressure on the blade and to a rotational speed of this blade which induce a critical operating mode of the blade.

The invention is not limited to this method, but also extends to a device suitable for implementing this method, and in particular to a device for monitoring an aircraft engine vane wheel, which includes:
- at least one sensor, each sensor being configured to acquire a time signal relative to moments when the vane wheel blades pass in front of the sensor; and
- means for determining a common flight phase of the aircraft;

characterised in that it includes signal processing means, configured to:
- correlating at least part of each time signal with a predetermined flight phase of a set of predetermined flight phases including at least one predetermined flight phase; and
- measuring, for each blade, for at least one aircraft flight, and for each predetermined flight phase, a first position of interest equal to the mean position, the so-called "balance position", of the top of the blade; and
- outputting said first positions of interest.

BRIEF DESCRIPTION OF THE FIGURES

The present invention will be understood more clearly on reading the description of examples of embodiments given merely by way of indication and which is in no way restrictive, with reference to the appended figures wherein.

DETAILED DESCRIPTION OF PARTICULAR EMBODIMENTS

According to the invention, interest is focused on the time progression of the position of a blade, in the wheel reference system. Particular attention is focused on the time progression of the top of a blade relative to the centre of rotation of the wheel. Throughout the text, this progression of the position of a blade over time is referred to as "blade movement".

A static component and a dynamic component of the blade movement are defined. The dynamic component corresponds to a vibration of the blade about a central position, or balance position. The static component corresponds to a shift in this balance position.

The underlying idea of the invention consists of detecting the damage to a blade by examining not the dynamic component of the movement of this blade, but merely the static component thereof.

The study of the static component of the blade movement gives access to new information on blades, without requiring high-frequency sampling and therefore high computing powers. Furthermore, and as explained in more detail hereinafter, a reduced number of sensors makes it possible to access reliable data on this static component.

Figure 1:
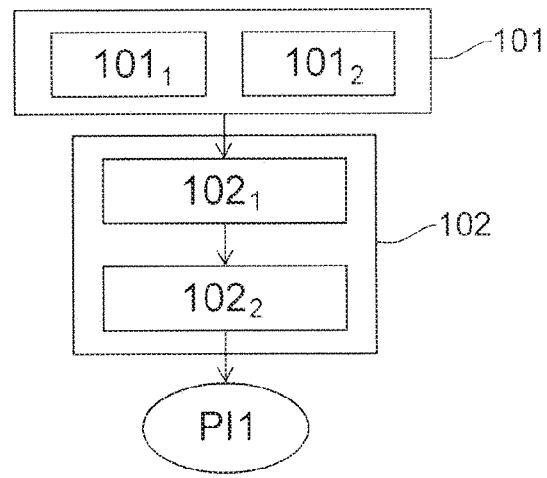
FIG. 1 schematically illustrates a first embodiment of the method according to the invention.

FIG. 1 schematically illustrates a first embodiment of the method according to the invention, implemented for monitoring an aircraft engine vane wheel.

The steps implemented for one of a plurality of flights of a series of aircraft flights, and for a predetermined flight phase, have been illustrated. The flights of the same series of flights are not necessarily consecutive.

These steps are implemented in turns during each of the flights of said series of flights. For each flight, these steps are implemented for one or a plurality of predetermined flight phase(s) by expert assessment during a prior step of the method according to the invention.

A predetermined flight phase corresponds, in terms of each blade, to a static pressure on the blade and to a rotational speed of this blade which induce a critical operating mode of the blade. As these quantities cannot be measured directly, "critical" flight phases are determined according to engine operating parameters (vane wheel rotational speed range for example) and engine environment parameters (temperature, altitude for example). This determination is performed by experts. As such, the predetermined flight phases are obtained, which can particularly include an acceleration phase, a deceleration phase, a reverse thrust phase. The predetermined flight phases are subsequently detected in common flight phases on the basis of the operating parameters of the engine or of the environment thereof.

During a first step 101,
for each sensor as defined hereinafter, a time signal representative of the moments when each of the vane wheel blades pass in front of this sensor is acquired (substep 101$_1$); and
the common flight phase of the aircraft is determined (substep 101$_2$).

During a first substep 102$_1$ of a second step 102, a predetermined flight phase is associated with at least a portion of each time signal. This can be described as an indexing step, during which information relative to the corresponding flight phase is assigned to a signal.

The method can include detection of the start and end of the predetermined flight phase, so as to control the recording of the time signal only between these two times.

The method can include selection of at least a portion of an acquired and recorded time signal, this part corresponding to said predetermined flight phase.

Subsequently, during a second substep 102$_2$ of the second step 102, a mean position of each blade is determined. Each mean position is therefore associated with a blade, a flight, and a flight phase. The mean position of a blade denotes a position of a fixed point of the blade, relative to a reference, and averaged over time. The fixed point is herein the top of the blade, i.e. the end of the blade opposite the centre of rotation of the vane wheel.

In other words, the instantaneous position of the top of a blade is the position of this point, measured by a sensor and for a given rotation of the vane wheel, and the mean position of the top of a blade is the mean of a plurality of instantaneous positions, measured by various rotations of the vane wheel, and by one or a plurality of sensors.

The position is in particular an angular position, on a disk centred on the centre of rotation of the vane wheel. The temporal mean is produced over a short time interval, for example less than 2 minutes. The temporal mean can be produced over a single time interval, or over a plurality of discontinuous time intervals all relating to the same flight and to the same flight phase. For example, the temporal mean is produced over 5 to 10 time intervals each between 1 s and 30 s in duration, for example 10 s.

The mean position of a blade is also referred to as the blade balance position, and forms a first position of interest, annotated PI1.

A sudden or progressive change of the balance position of a blade is particularly caused by:
plastic deformation of the blade, following an impact by a foreign body. For example, the blade bends in response to the absorption of the shock generated by the encounter between the blade and this foreign body. The deformation can depend on the flight conditions, and vary according to the flight phase; or
a change in the angular position of the blade assembly, relative to the centre of rotation of the vane wheel. For a blade assembled using a hammer fixing arrangement, such a shift can arise from the blade root sliding in the cell thereof, each blade root being housed in a dedicated cell. For a blade assembled using a pinned fixing arrangement, such a shift can arise from the blade root sliding in a circumferential groove extending along the entire periphery of a central disk of the vane wheel.

The balance position of a blade is thus an indicator for detecting, quickly and simply, the onset of damage on a blade. It is not sought to ascertain the blade vibration frequency. As such, the limitations and problems of the prior art, particularly relating to the use of a large number of sensors distributed along the entire circumference of rotation of the blade, for example on an inner surface of a casing or fairing, are avoided.

Preferably, for each flight, and for each blade, balance positions relating to different aircraft flight phases are measured. Indeed, some damage to the vane wheel can only be detected under certain operating conditions of the vane wheel.

Figure 2A:
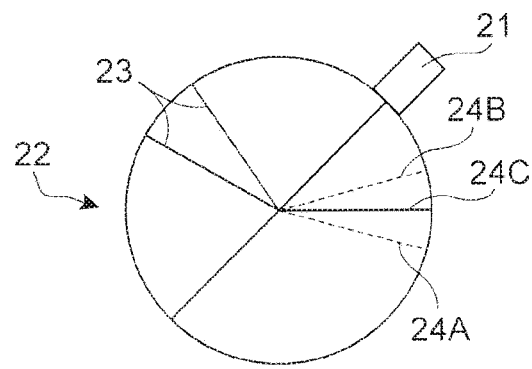
FIG. 2A schematically illustrates the acquisition of a time signal relative to moments when aircraft engine blades pass in front of a sensor.

FIG. 2A schematically illustrates the acquisition of a time signal relative to moments when the aircraft engine blades pass in front of a sensor.

FIG. 2A illustrates the case of a single sensor 21, arranged at the periphery of a vane wheel 22 having in this case five blades 23. The vane wheel can be that of a fan, a high-pressure compressor, or any other aircraft engine component.

However, the invention is not limited to such an arrangement, and can involve a plurality of sensors, for example at least three sensors. The plurality of sensors is then advantageously distributed irregularly on a casing surrounding the wheel.

The sensor 21 can be an eddy current sensor, or a capacitive, or optical, type sensor, or any other robust, precise, and compact sensor. Such a sensor is referred to as a "tip-timing" sensor, as it detects passage times relative to a time base.

The sensor 21 is arranged at the periphery of the vane wheel 22, and points towards the centre of rotation of the vane wheel 22. It detects the passage of the tops of the blades 23 and identifies the passage times relative to a time base.

A blade vibrates between two end positions 24A and 24B, between which the balance position 24C thereof is situated.

Figure 2B:
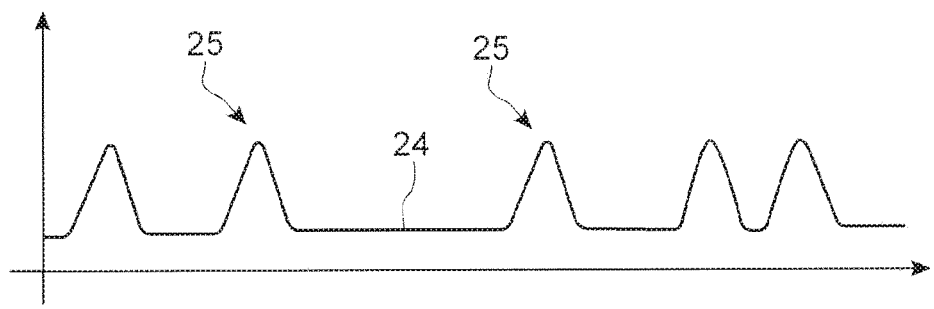
FIG. 2B illustrates the time signal acquired by the sensor represented in FIG. 2A.

FIG. 2B illustrates the time signal 24 acquired by the sensor 21 of FIG. 2A. The x-axis is a time axis. The y-axis corresponds to an amplitude. Each time a blade passes in front of the sensor 21 corresponds to a pulse 25. The time lag between two pulses 25 corresponds to a distance between the tops of two adjacent blades, these two quantities being correlated by the rotational speed of the vane wheel.

The vane wheel, or the rotor rotating same, can have a reference mark detectable by the sensor 21, such that it is possible to discriminate between the pulses relative to different wheel rotations. It is also possible to use this reference mark to calibrate the time signal and correlate the time lags between pulses with angular deviations. Given that there are 360° between two successive detections of the reference mark, time intervals can be converted into angular deviations. The rotational speed of the vane wheel can also be inferred therefrom. Alternatively, instead of a reference mark on the vane wheel or on the rotor thereof, a phonic wheel suitable for rotating at the same speed as the vane wheel, and a rotation counter detecting the passage of a reference mark on the phonic wheel are used.

Figure 3A:
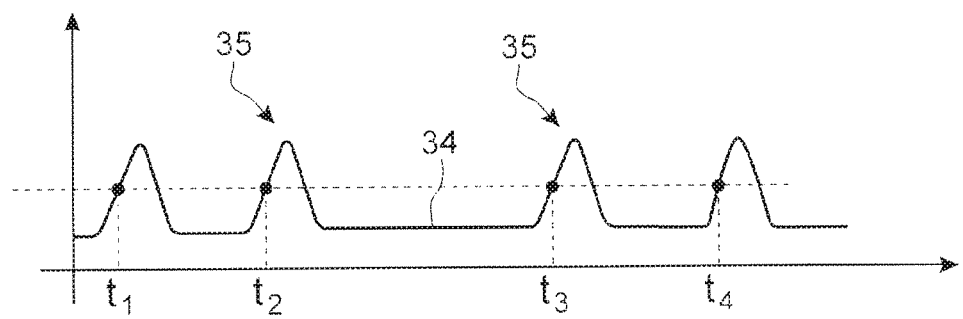
FIGS. 3A to 3C illustrate the measurement of a blade balance position, on the basis of a time signal such as that represented in FIG. 2B.
Figure 3B:
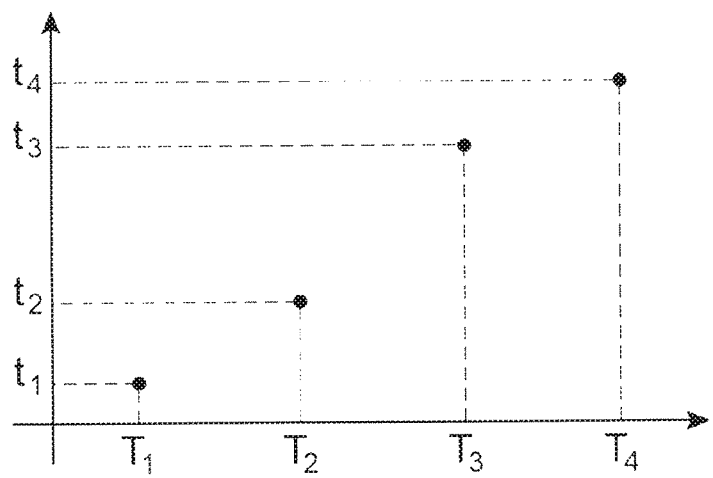
Figure 3C:
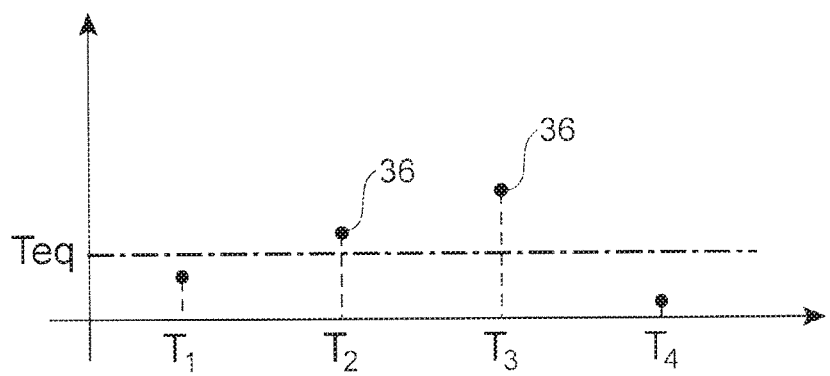

FIGS. 3A to 3C illustrate the measurement of a balance position of a blade, on the basis of a time signal such as that represented in FIG. 2B. This measurement involves, for each blade, the application of low-frequency filtering on a time signal representative of the movement by the blade.

FIG. 3A illustrates a time signal 34, obtained by synchronising and combining the time signals each acquired by a sensor, and by selecting only the pulses 35 relative to one of the blades. The measurements made by different sensors can be combined in the knowledge of the positions of the sensors with respect to one another.

For example, a passage of the blade in front of the sensor is defined as the intersection between a rising edge of a pulse 35 with a constant reference amplitude. As such, the times $t_1$, $t_2$, $t_3$ and $t_4$ correspond to the four pulses represented in FIG. 3A.

FIG. 3B illustrates a graph wherein the absolute times $t_1$, $t_2$, $t_3$ and $t_4$ are represented as a function of a reduced time. The reduced time corresponds to the time reduced by the rotational speed of the vane wheel. This involves correcting the time measurements for the effect of a variation in the rotational speed, from one rotation to another of the vane wheel. In particular, each time $t_i$ can be expressed as a function of a time $T_i$ such that $T_i = t_i * \Omega(t_i)/\Omega_{ref}$, where $\Omega_{ref}$ is a reference rotational speed, and $\Omega_i$ is the rotational speed at the time $t_i$.

FIG. 3C corresponds to FIG. 3B, wherein the y-values of the dots are correct for wheel rotation. Herein, each pulse 35 in FIG. 3A corresponds to a wheel rotation. As such, each dot in FIG. 3B corresponds to a wheel rotation. The time period so that the wheel rotates by 360° is inferred from the rotational speed of the wheel. The suitable multiples of this time period are subtracted from the times $t_1$, $t_2$, $t_3$ and $t_4$, so as to remove the effect of wheel rotation on the measurements $t_1$, $t_2$, $t_3$ and $t_4$.

A series of dots 36 illustrating the various positions of the blade, taken at each of the rotations of the vane wheel, is thereby obtained. These positions correspond herein to times, but these positions could also be expressed in angular units, these two concepts being linked by the rotational speed of the vane wheel. The balance position of the blade is defined by the mean value $T_{eq}$ between these different positions. These different positions can define an oscillatory signal, representative of the blade movement during the period of measurement of these positions. The balance position corresponds to the continuous component (very low frequency) of this oscillatory signal. The balance position can be obtained using mere low-pass filtering of this oscillatory signal.

The balance position can be expressed as a unit of time or as an angular unit. By convention, a balance position is negative in the direction of rotation of the wheel, viewed from the front of the aircraft.

According to the invention, it is only sought to measure mean signal values, and not to characterise an oscillation, for example by the frequency thereof. Sub-sampling of the movement actually achieved by the blade does not allow to access the blade oscillation frequency. However, it can allow to define the balance position of the blade. Sub-sampling of the movement actually achieved by the blade can mean a bias (constant shift) between the actual balance position of the blade and the balance position measured. By comparing a measured balance position with other balance positions measured in the same way, this bias can be avoided. For example, a current balance position and an initial balance position are compared, or the progression of a balance position during flights is studied. The method according to the invention therefore makes it possible to detect damage to a blade reliably, using a reduced number of sensors, for example three, or even merely two or even a single sensor.

It can be noted that if a single sensor is used, and a blade vibrates according to a vibration frequency equal to a whole multiple of the blade rotation frequency, the sensor always detects the same blade position. However, a static blade position can be measured, which will be modified in the event of blade damage. As such, it will always be possible to detect blade damage. Such detection would be impossible, under the same conditions, using the blade vibration frequency.

The invention does not involve complex data processing: it is possible to simply acquire a sub-sampled signal, and the main data processing operation to be performed is mere low-pass filtering. Therefore, the invention offers quick detection means of blade damage, inexpensive in terms of onboard computing power.

Figure 4:
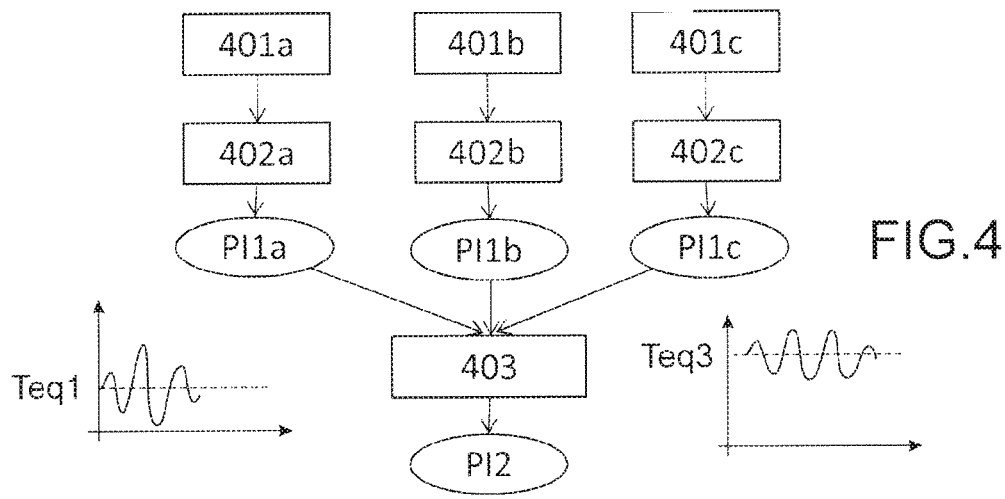
FIG. 4 schematically illustrates a second embodiment of the method according to the invention.

FIG. 4 schematically illustrates a second embodiment of the method according to the invention.

The steps implemented for the same predetermined flight phase are illustrated.

Steps 401a, 402a correspond to steps 101 and 102 in FIG. 1, implemented for a first flight. Following step 402a, the first position of interest PI1a is obtained for each blade, corresponding to the balance position of the blade associated with this first flight and with said predetermined flight phase. The oscillatory signal corresponding to the movement of a blade during this first flight and for said predetermined flight phase has been represented in FIG. 4. The mean value of this oscillatory signal is $T_{eq1}$, which corresponds to the first position of interest PI1a.

Steps 401b, 402b correspond to steps 101 and 102 in FIG. 1, implemented for a second flight. Following step 402b, the first position of interest PI1b is obtained for each blade, corresponding to this second flight and to said predetermined flight phase.

Steps 401c, 402c correspond to steps 101 and 102 in FIG. 1, implemented for a third flight. Following step 402c, the first position of interest PI1c is obtained for each blade, corresponding to this third flight and to said predetermined flight phase. The oscillatory signal corresponding to the movement of a blade during this third flight and for said predetermined flight phase has been represented in FIG. 4. The mean value of this oscillatory signal is $T_{eq3}$, which corresponds to the third position of interest PI1c.

The method then includes a step 403 for computing, for each blade, the mean value of the first positions of interest previously measured. This mean value is named the second position of interest PI2. Therefore, for each blade, and for said predetermined flight phase, a mean value is obtained which includes the measurements associated with a plurality of previous flights, in order to provide single immediately usable value.

Alternatively, the median value of said first positions of interest is computed.

According to this embodiment, the different flights in question are successive, the analysis being for example conducted every two or three flights. Advantageously, the flights in question are consecutive flights.

Figure 5:
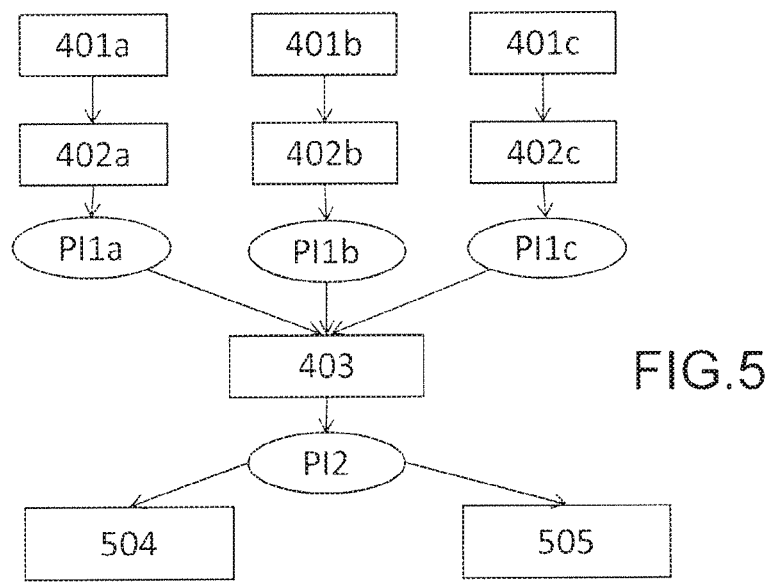
FIG. 5 schematically illustrates a third embodiment of the method according to the invention.

FIG. 5 schematically illustrates a third embodiment of the method according to the invention.

The method illustrated in FIG. 5 only differs from the method illustrated in FIG. 4 in that it includes additional steps using the second position of interest PI2, relative to a plurality of flights and to a predetermined flight phase.

In a step 504, for each blade and for said predetermined flight phase, the second position of interest PI2 and a reference position associated with said blade are compared.

The reference positions used for each blade are advantageously the same, regardless of the flight phase in question.

The reference position associated with a blade can be a value obtained empirically, for example during one or a plurality of flights at the start of the lifetime of the wheel, when it is known that the blade has no damage. The effect of measurement bias is thereby easily avoided.

Alternatively, the reference position associated with a blade can be a theoretical value, stipulated to the manufacturer. This theoretical value can be corrected for any measurement bias, in order to be able to be compared with positions of interest which are themselves measured.

The reference positions of the blades preferably correspond to blades angularly equidistributed over 360°.

When the second position of interest PI2 and the reference position exhibit a deviation greater than a predetermined threshold, it is inferred that the corresponding blade is damaged.

The predetermined threshold can be obtained by correlation with other known techniques for detecting blade damage, or on the basis of measurements on blades with known damage.

The predetermined threshold is preferably the same for all the blades. The predetermined threshold is preferably the same for all the predetermined flight phases, or at the very least for all the flights phases which are favourable for tracking damage, i.e. those wherein the aerodynamic loading is the greatest and where the mechanical stress applied to the blade structure is thus the greatest.

On the basis of the deviation between the second position of interest PI2 and the reference position, the vane damage can be quantified, for example on the basis of calibration data obtained by means of measurements on blades with known damage or by correlation with other known techniques for quantifying damage on a blade.

In addition, or alternatively, in the step 505, tracking is performed, for each blade and for said predetermined flight phase, of the values adopted by the second position of interest PI2 during a plurality of sets of flights. It is thereby possible to detect a progressive shift in the value adopted by the second position of interest PI2 over the flights. This shift is representative of the progressive damage of the blade. Progressive wear of the blade is detected for example.

For example, when the value adopted by the second position of interest PI2 is increasingly shifted in a given direction (increasing, or decreasing), it is inferred that the corresponding blade is starting to show signs of wear. It is thereby possible to plan a maintenance operation before the damage actually becomes problematic.

Here again, reference can be made to calibration data, obtained on blades with known wear, in order to correlate a gradient of the values adopted by the second position of interest PI2 with the onset of signs of wear on the blade.

The invention thereby makes it possible to detect the onset of damage to a blade, where this onset can be sudden or progressive.

Alternatively, balance position values averaged on a plurality of flights are not taken into consideration, but median values of these balance positions measured on a plurality of sets of consecutive flights.

The steps for comparing a position of interest to a reference position, and/or tracking the values adopted by a position of interest during the flights, can also be implemented on the first position of interest PI1. In this case, attention is not focused on the mean or median balance positions over a set of a plurality of flights, but on the balance positions for each flight of a series of consecutive flights making it possible to calculate a moving average.

Figure 6:
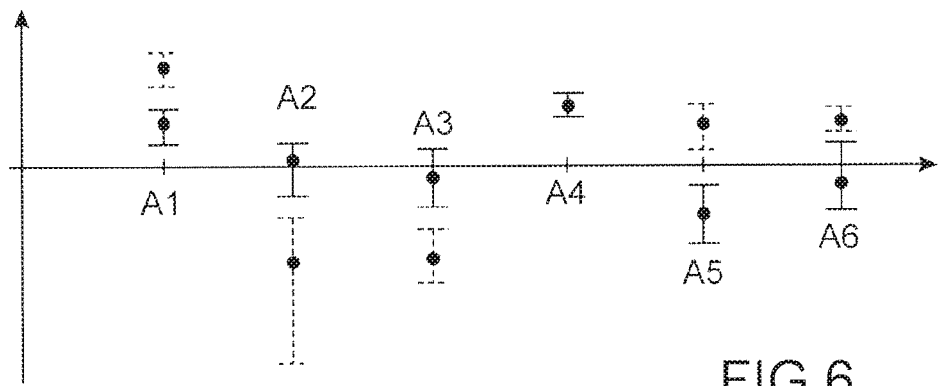
FIG. 6 illustrates measurements obtained using a method according to the invention.

FIG. 6 illustrates measurements obtained using an advantageous embodiment of the method according to the invention.

The x-axis is graduated according to blade index. Six indexed blades A1, A2, A3, A4, A5 and A6 have been represented herein.

The y-axis corresponds to balance positions. It is graduated for example in angular units. The zero ordinate corresponds to the positions of the blades if they were equidistributed angularly.

FIG. 6 represents a box plot representing, for each blade and for two sets of flights, the first balance positions associated with a predetermined flight phase.

For each blade, a first set of ten flights is represented by a solid-line segment, and a second set of ten flights is represented by a dotted-line segment. The two sets of flights are not consecutive. The first set of flights corresponds to the start of the lifetime of the vane wheel. The second set of flights corresponds to the mid-point of the lifetime of the vane wheel. For example, over 1500 flights separate the first and second sets of flights.

On each segment, the high value corresponds to the maximum value of the balance positions measured on the set of flights, the low value corresponds to the minimum value of these balance positions, and the dot corresponds to the mean value of these balance positions.

For the blade A4, the solid-line segment is very far removed from the dotted-line segment, conveying the onset of damage on the blade A4 between the two sets of flights studied.

For the blade A2, the dotted-line segment is much broader than the other segments in FIG. 6. This spread corresponds to a loss of measurement quality. If this spread is found on all the blades, the onset of damage of the acquisition chain at the output of the sensor 21 can be inferred therefrom. It is therefore possible to detect an anomaly of the acquisition chain at the output of a sensor, by measuring, for each blade, the progression of the dispersion of the balance positions associated with a same flight phase.

Figure 7:
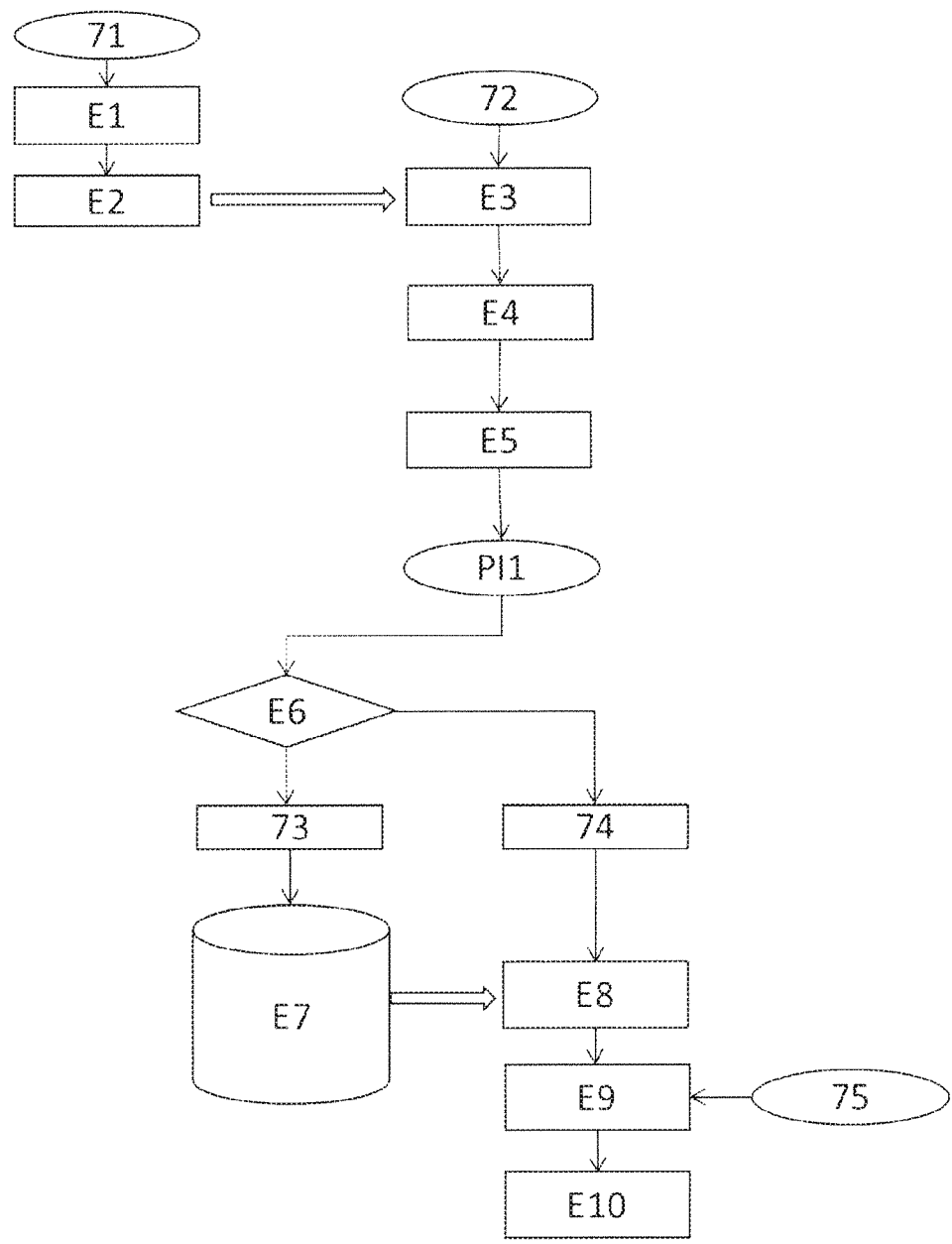
FIG. 7 schematically illustrates a fourth embodiment of the method according to the invention.

Using FIG. 7, a detailed example of the method according to the invention will now be illustrated.

Obviously, it is merely a particular example and numerous alternatives can be envisaged without leaving the scope of the present invention.

The steps implemented during a particular flight of the aircraft are detailed in FIG. 7. The same steps are repeated for a plurality of flights of a series of aircraft flights. Preferably, for each flight, the same steps are implemented for a plurality of predetermined flight phases.

At step E1, during an aircraft flight, on the basis of data 71, the flight phase wherein the aircraft is situated is determined. The data 71 particularly include the rotational speed of the monitored vane wheel.

At step E2, the recording of a signal 72 is controlled, when it is detected that the aircraft is in a predetermined flight phase according to the invention. The recording of the signal 72 corresponds to step E3.

The signal 72 corresponds to at least a portion of at least one time signal, each time signal being acquired by a sensor according to the invention. Such a sensor notes the passage times of the tops of the aircraft blades at a predetermined point.

Step E3 also includes a correlation of a portion of a signal with a predetermined flight phase. In other words, each portion of a signal is indexed to be associated with a predetermined flight phase.

At step E4, the signal 72 is processed in order to infer therefrom, for each blade and for a predetermined flight phase, a so-called elementary balance position. This step corresponds to obtaining a balance position as detailed with reference to FIGS. 3A to 3C. This step particularly comprises arrangement of the signal portions in order to juxtapose same by blade and by flight phase, a transition to a time scale reduced by the rotational speed, etc. The signal portions can be obtained from different sensors.

The recording E3 of the signal 72 is performed for a period of a few seconds, for example 5 to 20 seconds, and repeated several times for the same predetermined flight phase, for example 5 to 20 times. The same predetermined flight phase can occur several times per flight. To each iteration of step E3, there is a corresponding iteration of step E4, such that a plurality of elementary balance positions is obtained, for each blade and for the predetermined flight phase.

Advantageously, the plurality of iterations of steps E3 and E4 are not implemented consecutively. In other words, it is determined that the aircraft is situated in a first flight phase and a first elementary balance position is computed for each blade. Some time later, it is detected that the aircraft is once again situated in the first flight phase, and a second elementary balance position is computed for each blade.

According to an alternative embodiment not shown, the time signal acquired by each sensor throughout the flight is recorded, and the usable signal portions are subsequently selected.

At step E5, for each blade and for each predetermined flight phase, a mean of the plurality of elementary balance positions obtained is computed. The balance position or first position of interest PI1 is thereby obtained, for each predetermined flight phase and for each blade. This consists of a consolidated balance position value. Balance position measurements which appear to be aberrant as they are too far removed from the other measurements, for the same blade, the same flight and the same flight phase, can optionally be removed at this point.

At step E6, it is determined whether the case is situated in a learning configuration 73, or in a detection configuration 74.

If situated in a learning configuration 73, the first positions of interest PI1 are stored in a database, during a storage step E7. They can form reference positions each associated with a blade.

If situated in a detection configuration 74, step E6 is followed by a data analysis and comparison step E8, with a view to determining, for each blade, whether it has damage. Step E8 uses the data stored in step E7. This consists for example of comparing, for each blade and for each predetermined flight phase, the consolidated balance position (first position of interest) with a reference position. Following step E8, for each blade and for each predetermined flight phase, a difference between a reference position and a first position of interest is obtained.

At step E9, for each blade, this difference is compared to a predetermined threshold 75 associated with said blade.

At step E10, and when this difference is greater than the predetermined threshold for at least one blade and at least one predetermined flight phase, a notification signal is emitted identifying the blade and specifying if applicable the extent of the damage. For each blade, the threshold can be the same regardless of the flight phase. The thresholds can be identical for all the blades.

The notification signal can specify whether the damage requires immediate repair of the vane wheel, or whether a maintenance step is to be envisaged within a certain period as the vane wheel merely shows signs of wear.

In order to reduce the hardware resources to be placed onboard the aircraft for the implementation of the method according to the invention, steps E6 and following can be implemented on the ground, after transmission to a ground base of the balance positions obtained in step E5. Steps E4 and E5 can also be performed on the ground. The onboard-ground separation is a design choice. In any case, it will be sought to limit the number of computations performed onboard, the quantity of data to be transmitted and the quantity of data to be stored onboard.

Data exchanges can be performed when the aircraft is in flight and data exchange is possible with the ground. Alternatively, the set of data acquired during a flight is stored in a memory which is consulted by the base on the ground when the aircraft is on the ground, the memory subsequently being cleared.

Some examples of devices for implementing a method according to the invention will now be briefly described.

Figure 8:
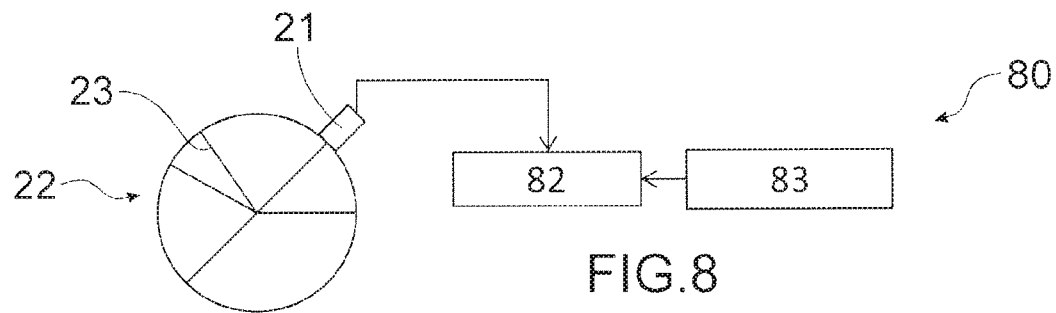
FIG. 8 schematically illustrates a first embodiment of the device according to the invention.

FIG. 8 illustrates very schematically, a first embodiment of such a device 80.

In FIG. 8, the sensor 21, the vane wheel 22 and the blades 23 as described with reference to FIG. 2A can be seen.

The device according to the invention includes means 83 for determining the flight phase wherein the aircraft is situated, for example on the basis of the rotational speed of the monitored vane wheel. This rotational speed can be obtained by means of the sensor 21.

Signal processing means 82, such as a calculator or a computer, are connected to the sensor 21 to receive a time signal relative to moments when the tops of the blades 23 pass in front of the sensor.

The means 83 are also connected to the signal processing means 82.

Preferably, the signal processing means 82 are configured to only record the signal supplied by the sensor 21 at suitable times. These suitable times, or time slots of interest, are dependent on the predetermined flight phase(s) chosen to implement the method according to the invention. These suitable times can also be dependent on the implementation of a consolidation of the measurements as defined in FIG. 7, with respect to step E5. Man-machine interface means can enable a human operator to define upstream the predetermined flight phase(s).

Alternatively, the signal processing means 82 receive all the signals acquired by the sensor 21 throughout each flight, and include means for selecting signal portions associated with slots of interest.

The signal processing means 82 are also configured to index a recorded signal, so as to associate same with a predetermined flight phase.

The signal processing means 82 are configured to measure, for each blade, and for at least one predetermined flight phase, a blade balance position.

The means 82 particularly include means for reconstructing, for each flight, for each blade and for each predetermined flight phase, an oscillatory signal representative of the blade movement, and means for low-pass filtering of this signal. The means 82 particularly implement a method as described with reference to FIGS. 3A to 3C. If applicable, the signal processing means 82 implement a consolidation of the balance position measurements, as described with reference to FIG. 7 and with respect to step E5.

The signal processing means 82 output, for the flight in question, for each blade and for each predetermined flight phase, the balance position or first position of interest. The processing means 82 can also provide a list of a plurality of balance positions of the blades, said list being presented in the form of a box plot as illustrated in FIG. 6.

The signal processing means 82 can comprise means for computing a mean or median value of different balance positions of each blade, for the same flight phase and for a plurality of flights of a set of aircraft flights. The signal processing means 82 can then output, for the set of flights in question, for each blade and for each predetermined flight phase, this mean or median value named second position of interest.

The signal processing means 82 can be connected to a memory (not shown), configured to store the balance positions measured. It is thereby possible to monitoring the progression of the balance positions during flights.

Figure 9:
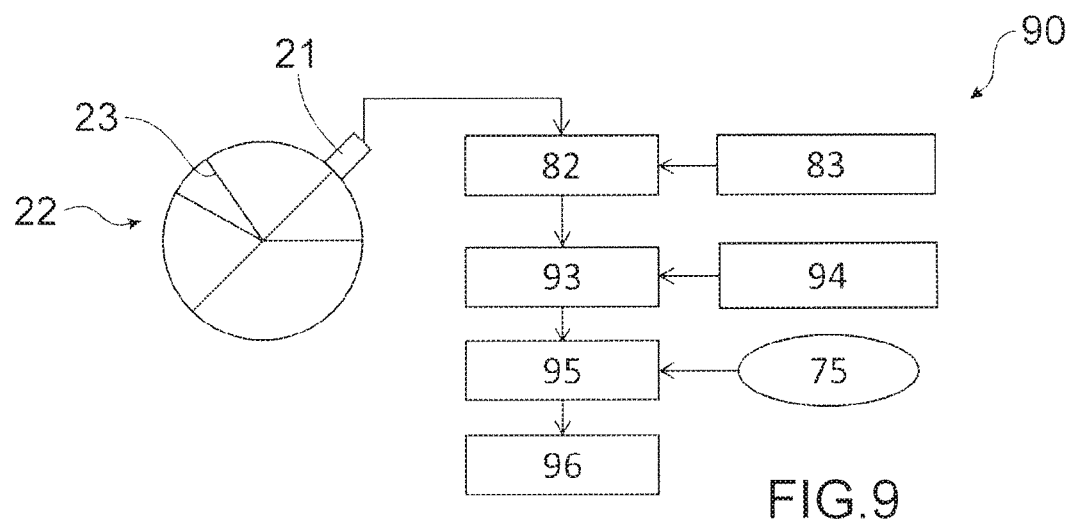
FIG. 9 schematically illustrates a second embodiment of the device according to the invention.

FIG. 9 schematically illustrates a second embodiment of the device 90 according to the invention. FIG. 9 will only be described in respect of the differences thereof relative to FIG. 8.

Comparison means 93 are connected at the input to signal processing means 82, and to a database 94 storing reference positions. The comparison means 93 compare, for each blade and for each predetermined flight phase, the position of interest (first or second) supplied by the signal processing means, and a reference position.

The data stored in the database 94 can be obtained during an initial learning phase.

The comparison means 93 output, for each blade and for each predetermined flight phase, a difference between a position of interest and a reference position.

Detection means 95 receive as an input, this difference, as well as the threshold 75 associated with said blade and with said flight phase (see FIG. 7). The thresholds can be stored in a dedicated database, or in the database 94. The same threshold may be involved regardless of the blade or flight phase.

Notification means 96 are configured to emit a notification signal when this difference is greater than the threshold 75 for at least one blade and at least one flight phase. The characteristics of this notification signal are defined with reference to FIG. 7, with respect to step E10.

Alternatively or additionally, the device 90 can include means for computing, for each blade and for each flight phase, a gradient of the positions of interest adopted by each blade during a plurality of aircraft flights. Subsequently, similarly to the description with respect to the means 95 and 96, the device includes means for comparison with a predetermined threshold and means for emitting a notification signal when this gradient is greater than the predetermined threshold for at least one blade and at least one flight phase.

The implementation of the method according to the invention can be accompanied by:
- unbalance tracking on the vane wheel, liable to confirm a diagnosed change of position of a blade, and/or
- blade damage detection implementing "tip timing" detection and frequency analysis, liable to confirm a diagnosed change of balance position of a blade in response to a shock.

Figure 10:
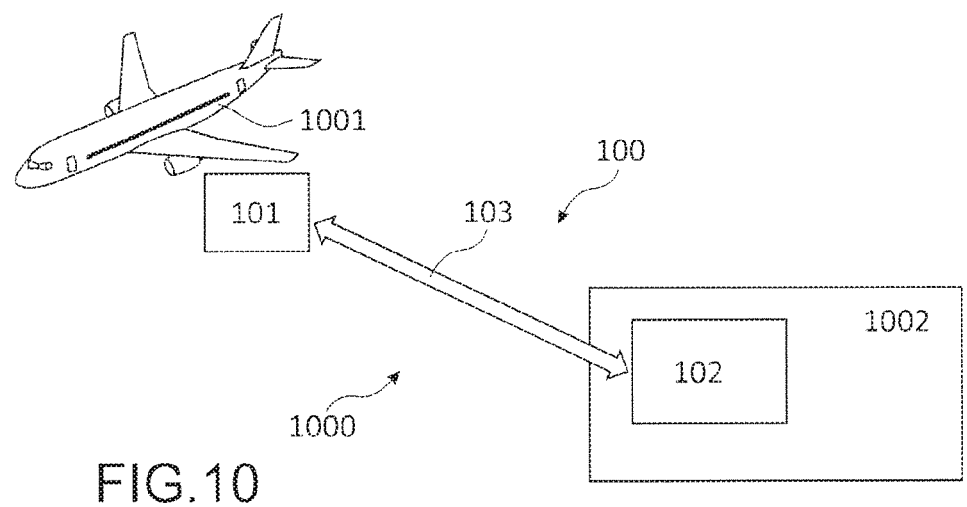
FIG. 10 schematically illustrates a third embodiment of the device according to the invention.

FIG. 10 schematically illustrates a third embodiment of the device according to the invention.

The device 100 according to this third embodiment is composed of:
- a first module 101, receiving at least the sensor and preferably the means for determining a flight phase of the aircraft; and
- a second module 102, receiving preferably the set of processing means according to the invention.

The first module is connected to the second module by communication means symbolised by the arrow 103. They may consist of wireless communication means, or removable wired communication means fitted when the aircraft is on the ground.

The wireless communication means can be air-ground communication means, using for example the ACARS (Aircraft Communication Addressing and Reporting System) data transmission system.

The first module is onboard an aircraft 1001, whereas the second module is situated on a ground base 1002. The whole forms a system according to the invention 1000, wherein minimal components are onboard the aircraft so as to optimise the weight in flight, and above all the resources required onboard the aircraft in terms of computing power.

What is claimed is:

1. A method for monitoring an aircraft engine vane wheel, which includes:
acquiring at least one time signal relative to moments when the vane wheel blades pass in front of at least one sensor, wherein said at least one time signal is composed of pulses, and wherein each time a top of one of the blades passes in front of the at least one sensor corresponds to a pulse in the at least one time signal;

determining a common flight phase of the aircraft;

for each flight in a series of flights of the aircraft, correlating at least part of the at least one time signal with a predetermined flight phase of a set of predetermined flight phases including at least one predetermined flight phase;

for each blade, each flight of said series of aircraft flights, and for each predetermined flight phase, and based on the at least one time signal, measuring a first position of interest equal to a balance position of a top of the blade, the balance position of the top of the blade being the position of a point of the blade, averaged over time; and for each blade and for each predetermined flight phase, determining a static component of a movement of the blade, said static component corresponding to a shift in the balance position, and each static component taking into account at least one flight from said series of flights.

2. The method according to claim 1, characterised by measuring the first position of interest for at least two predetermined flight phases.

3. The method according to claim 1, characterised by computing, for each blade, and for each predetermined flight phase, a second position of interest equal to a mean value or a median value of a plurality of balance positions each balance position being associated with one of a plurality of aircraft flights.

4. The method according to claim 3, characterised by tracking the second positions of interest over flights, to detect a progressive shift in the second positions of interest.

5. The method according to claim 3, characterised by comparing a reference position and a second position of interest over flights to detect the appearance of a shift due to damage on the blade.

6. The method according to claim 1, further comprising comparing a reference position and the first position of interest, to detect the appearance of a shift due to damage on the blade.

7. The method according to claim 1, characterised by tracking the first positions of interest over flights, to detect a progressive shift in the first positions of interest.

8. The method according to claim 1, characterised in that the balance position of a blade is measured using a single sensor configured to detect the passage of the top of a vane wheel blade at a predetermined point.

9. The method according to claim 1, characterised by testing for an anomaly in an acquisition chain of the at least one time signal, said testing involving a measurement of the deviation between an extrema of a set of balance positions associated with the same blade and the same predetermined flight phase, the balance positions of said set each corresponding to one of a plurality of aircraft flights.

10. The method according to claim 1, further comprising a step of determining, by assessment, said set of predetermined flight phases, a predetermined flight phase corresponding, for each blade, to a static pressure on the blade and to a rotational speed of this blade which induce a critical operating mode of the blade.

11. The method according to claim 1, wherein a time lag between two pulses of the at least one time signal corresponds to an angular distance between the tops of two adjacent blades.

12. A device for monitoring an aircraft engine vane wheel, the device including:

at least one sensor, each sensor being configured to acquire a time signal relative to moments when the vane wheel blades pass in front of the at least one sensor, wherein said time signal is composed of pulses, and wherein each time a top of one of the blades passes in front of the at least one sensor corresponds to a pulse in the time signal; and a processor configured to:

determine a common flight phase of the aircraft;

correlate at least part of the time signal with a predetermined flight phase of a set of predetermined flight phases including at least one predetermined flight phase;

measure, for each blade, for at least one flight in a series of flights of the aircraft, and for each predetermined flight phase, and based on the time signal, a first position of interest equal to a balance position of a top of the blade, the balance position of the top of the blade being the position of a point of the blade, averaged over time;

for each blade and for each predetermined flight phase, determine a static component of a movement of the blade, said static component corresponding to a shift in the balance position, and each static component taking into account at least one flight from said series of flights; and output first positions of interest.

13. The device according to claim 12, wherein the processor is further configured to compute, for each blade, and for each predetermined flight phase, a second position of interest equal to the mean value or the median value of balance positions each associated with one of a plurality of aircraft flights.

14. The device according to claim 13, wherein the processor is further configured to compare between a second position of interest and a reference position.

15. The device according to claim 13, wherein the processor is further configured to compute a gradient of second positions of interest throughout the flights.

16. The device according to claim 12, wherein the processor is further configured to compare between the first position of interest and a reference position.

17. The device according to claim 12, wherein the processor is further configured to compute a gradient of the first positions of interest throughout the flights.

18. The device according to claim 12, characterised in that it includes a single sensor.

19. The device according to claim 12, characterised in that it comprises:

a first module including the at least one sensor, the first module being configured to be installed onboard an aircraft;

a second module including at least a portion of the processor, the second module being configured to be installed on a ground base; and communication interface between the first module and the second module.

20. A method for monitoring an aircraft engine vane wheel, which includes:

determining, by assessment, a set of predetermined flight phases, a predetermined flight phase corresponding, for each blade, to a static pressure on the blade and to a rotational speed of this blade which induce a critical operating mode of the blade;

acquiring at least one time signal relative to moments when the vane wheel blades pass in front of a sensor, wherein said at least one time signal is composed of pulses, and wherein each time a top of one of the blades passes in front of the sensor corresponds to a pulse in the at least one time signal;

determining a common flight phase of the aircraft;

for each flight in a series of flights of the aircraft, correlating at least part of the at least one time signal with a predetermined flight phase of the set of predetermined flight phases including at least one predetermined flight phase;

for each blade, each flight of said series of aircraft flights, and for each predetermined flight phase, and based on the at least one time signal, measuring a first position of interest equal to a balance position of a top of the blade, the balance position of the top of the blade being the position of a point of the blade, averaged over time; and for each blade and for each predetermined flight phase, determining a static component of a movement of the blade, said static component corresponding to a shift in the balance position, and each static component taking into account at least one flight from said series of flights.

* * * * *